US00RE50447E

(19) United States
(12) Reissued Patent
Tan et al.

(10) Patent Number: US RE50,447 E
(45) Date of Reissued Patent: Jun. 3, 2025

(54) SYSTEM AND METHOD FOR IN-SITU MEASUREMENT OF VISCOELASTIC MATERIAL PROPERTIES USING CONTINUOUS-WAVE ULTRASOUND

(71) Applicant: THE CURATORS OF THE UNIVERSITY OF MISSOURI, Columbia, MO (US)

(72) Inventors: Jinglu Tan, Columbia, MO (US); Nilesh Salvi, Columbia, MO (US)

(73) Assignee: THE CURATORS OF THE UNIVERSITY OF MISSOURI, Columbia, MO (US)

(21) Appl. No.: 17/854,118

(22) Filed: Jun. 30, 2022

Related U.S. Patent Documents

Reissue of:
(64) Patent No.: 10,697,875
Issued: Jun. 30, 2020
Appl. No.: 15/880,849
Filed: Jan. 26, 2018

U.S. Applications:
(60) Provisional application No. 62/450,729, filed on Jan. 26, 2017.

(51) Int. Cl.
*G01N 11/00* (2006.01)
*G01N 29/024* (2006.01)
(Continued)

(52) U.S. Cl.
CPC ..... *G01N 11/00* (2013.01); *G01N 29/024* (2013.01); *G01N 29/223* (2013.01);
(Continued)

(58) Field of Classification Search
CPC ..... G01N 29/36; G01N 29/46; G01N 29/024; G01N 29/223; G01N 2291/102; G01N 2291/02818; G01N 2203/0094
See application file for complete search history.

(56) References Cited

U.S. PATENT DOCUMENTS 4,144,752 A * 3/1979 Lolk ..... G01F 1/662 73/861.28
4,346,599 A * 8/1982 McLaughlin ..... G01H 17/00 73/597
(Continued)

FOREIGN PATENT DOCUMENTS

WO WO 02/16924 * 2/2002

OTHER PUBLICATIONS

Biot, M.A., "Mechanics of Deformation and Acoustic Propagation in Porous Media", Reprinted from Journal of Applied Physics, vol. 33, No. 4, pp. 1482-1498, Apr. 1962 (18 pgs).
(Continued)

*Primary Examiner* — Robert L Nasser
(74) *Attorney, Agent, or Firm* — Stinson LLP

(57) ABSTRACT

A system and method for measuring one or more viscoelastic properties of a material under measurement is disclosed. The system includes an emitter-observer transducer pair separated by the material. A signal processing assembly is operable to (i) apply a plurality of excitation signals to the emitter transducer, wherein each of the excitation signals comprises a continuous-wave sinusoidal waveform, (ii) record a plurality of output signals at the observer transducer, wherein each of the output signals corresponds to one of the excitation signals, (iii) analyze the output signals to measure the sound speed of the material, and (iv) determine the viscoelastic properties of the material under measurement by optimizing the parameters of an infinite echo model. The system provides a non-destructive approach for in-situ measurement of viscoelastic material properties.

25 Claims, 12 Drawing Sheets

(51) Int. Cl.

| | |
|---|---|
| ***G01N 29/22*** | (2006.01) |
| ***G01N 29/24*** | (2006.01) |
| ***G01N 29/36*** | (2006.01) |
| ***G01N 29/46*** | (2006.01) |

(52) U.S. Cl.
CPC ..... *G01N 29/225* (2013.01); *G01N 29/2456* (2013.01); *G01N 29/36* (2013.01); *G01N 29/46* (2013.01); *G01N 2011/0073* (2013.01); *G01N 2203/0094* (2013.01); *G01N 2291/02818* (2013.01); *G01N 2291/102* (2013.01)

(56) References Cited

U.S. PATENT DOCUMENTS 4,616,197 A 10/1986 Wright
4,677,842 A * 7/1987 Piche ..... G01N 9/24 73/32 A
4,779,452 A * 10/1988 Cohen-Tenoudji .... G01N 11/00 73/54.41
5,141,331 A * 8/1992 Oehler ..... G01K 11/22 356/432
5,247,828 A * 9/1993 Candau ..... G01N 29/02 73/64.42
5,305,239 A * 4/1994 Kinra ..... G01H 5/00 702/39
5,365,778 A * 11/1994 Sheen ..... G01N 11/16 73/32 A
5,741,971 A * 4/1998 Lacy ..... E21B 47/0005 73/152.16
5,767,407 A 6/1998 Sinha
5,969,237 A * 10/1999 Jones ..... G01N 15/02 73/61.75
5,992,223 A * 11/1999 Sabins ..... G01N 29/032 73/54.03
6,050,141 A * 4/2000 Tello ..... E21B 21/08 73/152.56
6,082,181 A 7/2000 Greenwood
6,189,383 B1 * 2/2001 Tello ..... E21B 21/08 181/105
6,227,040 B1 * 5/2001 Hastings ..... G01N 29/032 73/54.41
6,422,081 B1 * 7/2002 Kawaguchi ..... G01H 5/00 73/597
6,538,958 B1 * 3/2003 Blankinship ..... E21B 21/08 250/268
6,687,643 B1 * 2/2004 Cason, Jr. ..... G01F 23/164 361/283.4
6,945,096 B1 * 9/2005 Jones ..... G01N 15/02 73/61.75
7,002,281 B2 2/2006 Andle
7,107,851 B2 * 9/2006 Owen ..... G01H 5/00 702/54
8,794,061 B1 * 8/2014 Sickels, Jr. ..... E21B 44/00 73/152.05
9,383,237 B2 * 7/2016 Wiklund ..... G01F 1/34
9,476,755 B2 * 10/2016 Hurmuzlu ..... G01F 25/00
10,317,375 B2 * 6/2019 Volker ..... G01N 29/024
10,408,052 B2 * 9/2019 Mandal ..... E21B 49/08
2005/0012431 A1 1/2005 Andle
2007/0144240 A1 6/2007 Andle
2009/0205427 A1 * 8/2009 Lootens ..... G01N 29/032 73/602
2010/0018309 A1 * 1/2010 Marcovecchio .... G01F 23/2962 73/290 V
2012/0197545 A1 * 8/2012 Burns ..... G01N 29/036 702/27
2013/0345994 A1 * 12/2013 Wiklund ..... G01F 1/34 702/46
2014/0296709 A1 10/2014 Fatemi et al.
2016/0169839 A1 * 6/2016 Gottlieb ..... G01N 29/36 367/7
2017/0016878 A1 * 1/2017 Khismatullin ..... G01N 33/4905
2017/0023532 A1 * 1/2017 Volker ..... G01N 29/024
2019/0383775 A1 * 12/2019 Rinne ..... G01N 29/04

OTHER PUBLICATIONS

Hagglund, F., et al., "Model-Based Estimation of Thin Multi-Layered Media Using Ultrasonic Measurements", IEEE Transactions on Ultrasonics, Ferroelectrics, and Frequency Control, Vo. 56, No. 8, Aug. 2009 (14 pgs).
Shah, V, et al., "Effect of Viscosity on Ultrasound Wave Reflection from a Solid/Liquid Interface", Ultrasonics 34 (1996) pp. 817-824 (13 pgs).
Greenwood, M., et al., "Measurement of Viscosity and Shear Wave Velocity of a Liquid or Slurry for On-Line Process Control", Ultrasonics 39 (2002) pp. 623-630 (8 pgs).
Peirlinckx, L., et al., "Identification of Parametric Models for Ultrasonic wave Propagation in the Presence of Absorption and Dispersion", IEEE Transactions on Ultrasonics, Ferroelectrics and Frequency Control, vol. 40, No. 4, Jul. 1993 (11 pgs).
Nasch, P., et al., "Anomalous Behavior of Sound Velocity and Attenuation in Liquid Fe—Ni—S", Science, vol. 277, Jul. 11, 1997 (4 pgs).
Pialucha, T., et al., "Amplitude Spectrum Method for the Measurement of Phase Velocity", Ultrasonics, vol. 27 Sep. 1989 (11 pgs).
Blackstock, D. T., "Fundamentals of Physical Acoustics", Chapter 13: "Radiation from a Baffled Piston", A Wiley-Interscience Publication, John Wiley & Sons, Inc. (2000), pp. Cover, 440-442, 444, 446-449, 451 (10 pgs).

* cited by examiner

SYSTEM AND METHOD FOR IN-SITU MEASUREMENT OF VISCOELASTIC MATERIAL PROPERTIES USING CONTINUOUS-WAVE ULTRASOUND

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is based on and claims priority to U.S. Provisional Application Ser. No. 62/450,729, filed on Jan. 26, 2017, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The present invention relates to the field of non-destructive rheological measurement of materials using ultrasound.

2. Description of Related Art

The application of ultrasound to an unidentified material for the purpose of performing a quantitative assessment of the viscoelastic properties of the material is known for use in material identification. However, experimental measurements made with ultrasound pulses or other broad-band excitations are prone to errors because typical viscoelastic materials do not have a flat frequency response to mechanical vibrations. As a result, viscoelastic property evaluations that rely on the use of multi-frequency excitations, such as those used with time-of-flight and phase difference techniques, often suffer from a low signal-to-noise ratio (SNR). It is also known to use continuous-wave excitations to minimize errors associated with frequency dependence and thus improve the SNR. However, the use of continuous-wave excitations in ultrasound-based measurements has not been well developed in comparison to time-of-flight and phase difference techniques. Further, all of the foregoing techniques require that a sample of material be tested in a laboratory setting using standard instrumentation in order to assess the viscoelastic properties of the material. These techniques cannot be used in conjunction with automated processes and, in particular, the lack of a technique to measure viscosity in-situ has been a primary obstacle to optimization and automation of many processes.

BRIEF SUMMARY OF THE INVENTION

The present invention is directed to a system and method for measurement of the viscoelastic properties of a material using continuous-wave ultrasound. The system includes an emitter transducer and an observer transducer that are positioned within a material under measurement. The transducers are coaxially mounted a distance apart and may be supported by a variety of different types of probes or other hardware configurations, such as a brick-shaped reservoir that contains the material (in which case the transducers are supported by the sidewalls of the reservoir), a C-shaped fixture that is submergible into the material (in which case the transducers are supported by support arms of the fixture), a rail that is submergible into the material (in which case the transducers are supported by the rail), a conduit that is submergible into the material (in which case the transducers are supported within the conduit), or a vessel that contains the material (in which case the transducers are supported by either the sidewalls or the top and bottom walls of the vessel). Preferably, the emitter transducer and/or the observer transducer are spherically focused so as to minimize wave spreading loss, although non-focused transducers may also be used.

The system also includes a signal processing assembly that is operable to perform a number of functions. First, an excitation signal comprising a continuous-wave sinusoidal waveform is applied to the emitter transducer. This waveform travels back and forth between the transducers before the waveform is completely attenuated. The original excitation signal and infinite echoes form a summation spatial wave over the distance between the transducers and a summation temporal wave at the observer transducer. This summation temporal wave is recorded as an output signal at the observer transducer. These steps are repeated using a frequency sweep technique so as to enable the collection of a data set that include a plurality of input frequencies (i.e., the frequency of the excitation signal applied to the emitter transducer) and associated output amplitudes (i.e., the amplitude of the output signal recorded at the observer transducer).

The signal processing assembly then analyzes the data set to measure the sound speed of the material under measurement. To do so, an amplitude wave is generated by plotting the output amplitudes as a function of the input frequencies. The period of the amplitude wave is then determined. In one embodiment, the period of the amplitude wave is determined by graphically measuring the period of the amplitude wave. In another embodiment, the period of the amplitude wave is determined by generating a Frequency Transform (FT) of the amplitude wave, identifying the frequency corresponding to the highest peak in the Frequency Transform (FT) of the amplitude wave, and calculating the period of the amplitude wave based on the identified frequency. The latter embodiment is preferred insofar as it provides a more accurate measurement of the period of the amplitude wave. The sound speed may then be calculated based on the period of the amplitude wave and the distance between the transducers.

Finally, the measured sound speed is used as an input to a parametric optimization algorithm to determine one or more viscoelastic properties of the material under measurement. In an exemplary embodiment, viscosity is the measurand of prime interest, although the algorithm also provides a correction for the measured sound speed. In this case, the density is known from prior measurement and compensated for temperature variations. Of course, the parametric optimization algorithm may also be used to determine other material properties such as elasticity and density in accordance with the present invention.

The present invention provides a non-destructive system and method for the measurement of the viscoelastic properties of a material that can be used in-situ (e.g., with applications that involve automated processes) or in a laboratory setting. Also, because continuous-wave excitations are used to obtain the ultrasound-based measurements, the invention provides an improvement in SNR of several orders of magnitude in comparison to measurements made with ultrasound pulses or other broad-band excitations. Other advantages offered by the invention are described herein or will otherwise be apparent to one skilled in the art.

DETAILED DESCRIPTION OF EXEMPLARY EMBODIMENTS

The present invention is directed to a system and method for measurement of the viscoelastic properties of a material using continuous-wave ultrasound. While the invention will be described in detail below with reference to various exemplary embodiments, it should be understood that the invention is not limited to the specific configurations or methodologies of these embodiments. In addition, although the exemplary embodiments are described as embodying several different inventive features, one skilled in the art will appreciate that any one of these features could be implemented without the others in accordance with the present invention.

In general terms, the present invention is directed to a continuous-wave ultrasound methodology for measuring the viscoelastic properties of a material in-situ and includes the following steps: (1) provide an emitter-observer transducer pair separated by a material under measurement; (2) apply an excitation signal comprising a continuous-wave sinusoidal waveform to the emitter transducer and record the output signal at the observer transducer; (3) provide an infinite echo model for the observed output signal comprising a sum of the excitation signal and attenuated echoes as modulated by the viscoelastic properties of the material and transducer reflection characteristics; (4) measure the sound speed of the material based on a recorded amplitude wave of the output signal with respect to input signal frequency; and (5) utilize the measured sound speed as an input to a parametric optimization algorithm to determine the viscoelastic properties of the material in accordance with the infinite echo model. The result is a non-destructive method for in-situ measurement of material viscosity that provides advantages over conventional techniques, as described below.

1. Instrumentation

Figure 1:
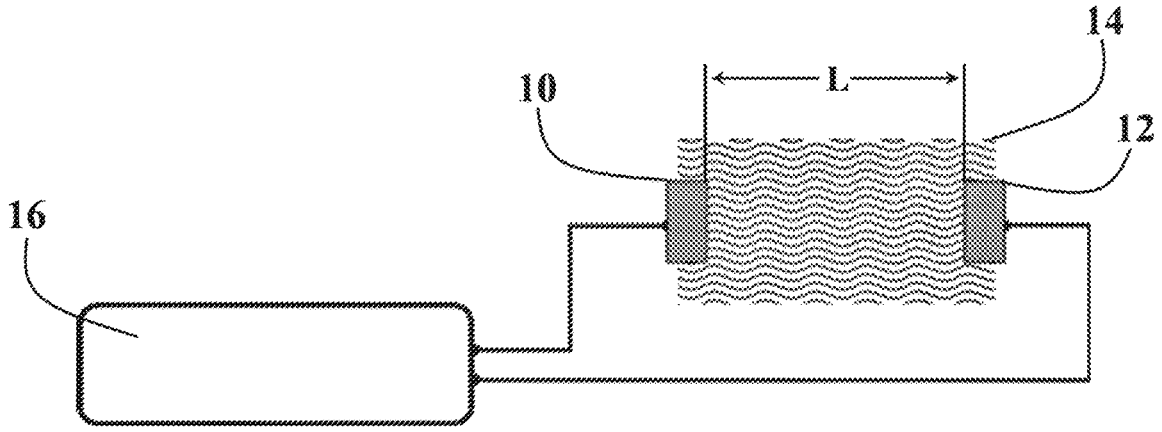
FIG. 1 is a schematic diagram of a system with an emitter-observer transducer pair for use in analyzing the viscoelastic properties of a material under measurement using continuous-wave ultrasound.

A schematic diagram of a system for measurement of the viscoelastic properties of a material using continuous-wave ultrasound is shown in FIG. 1. The system includes a pair of ultrasound transducers 10 and 12 positioned on opposite sides of a material under measurement 14. The face-plates of transducers 10 and 12 are separated by a distance L. As described below, transducers 10 and 12 form an emitter-observer transducer pair in which transducer 10 functions as the emitter and transducer 12 functions as the observer. Transducers 10 and 12 are connected to a signal processing assembly 16, which includes various types of equipment and computing devices as described below.

Figure 11:
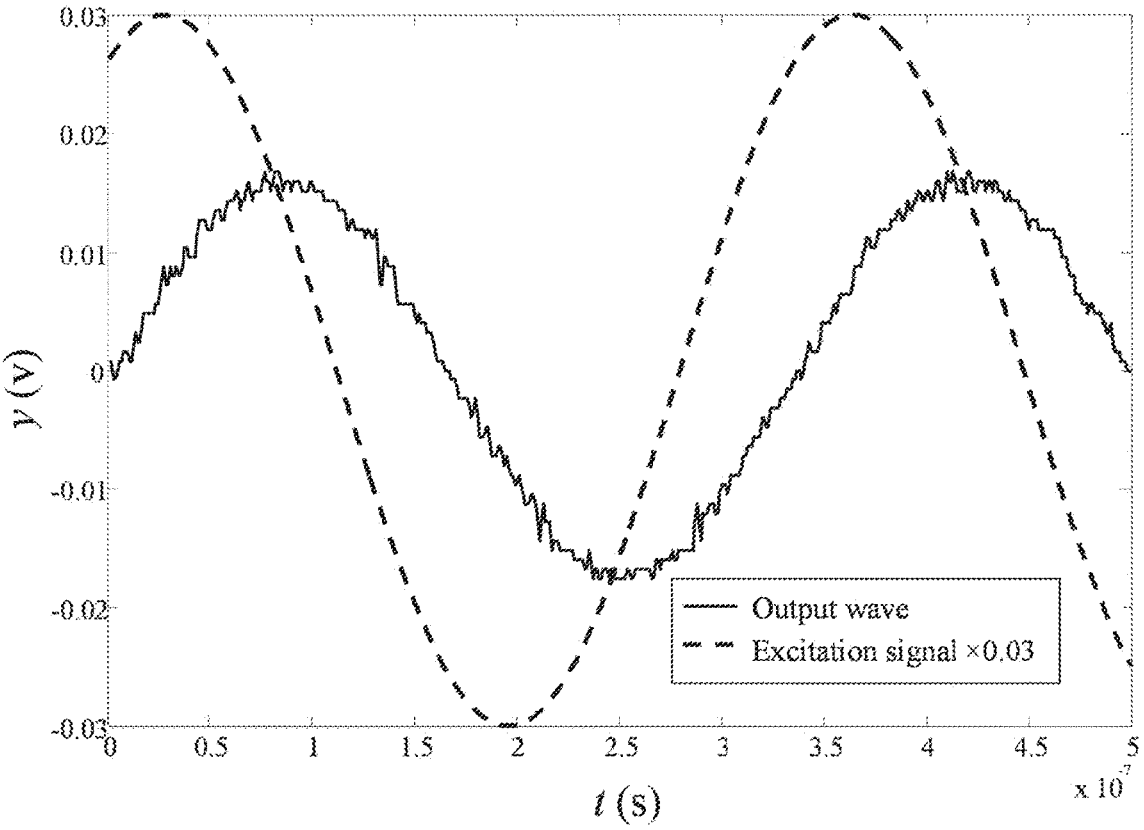
FIG. 11 depicts an exemplary excitation signal applied to an emitter transducer and an exemplary output signal recorded at an observer transducer.

Signal processing assembly 16 includes a signal generator configured to generate an excitation signal in the form of a continuous-wave sinusoidal waveform having a specified frequency and amplitude (such as the exemplary excitation signal shown in FIG. 11, described below). In an exemplary embodiment, the excitation signal is generated by an RS Model DS340 15 MHz Synthesized Function Generator available from Stanford Research Systems of Sunnyvale, Calif. Of course, other types of equipment may also be used to generate the excitation signal in accordance with the present invention. This excitation signal is applied to transducer 10 whereby the waveform travels back and forth between the face-plates of transducers 10 and 12 before the waveform is completely attenuated to form a standing wave. The original excitation signal and infinite echoes form a summation temporal wave at observer transducer 12.

Signal processing assembly 16 records the summation wave as an output signal detected by transducer 12. The output signal comprises a sinusoidal waveform having the same frequency as the excitation signal, but with an amplitude loss and phase lag with respect to the excitation signal (such as the exemplary output signal shown in FIG. 11, described below). In an exemplary embodiment, the output signal is recorded by a GDS-2062 Series 60 MHz Digital Storage Oscilloscope available from GW Instek of New Taipei City, Taiwan. Of course, other types of equipment may also be used to record the output signal in accordance with the present invention.

Transducers 10 and 12 may comprise any type of ultrasound transducers known in the art, such as the Panametrics-NDT™ A301S ultrasound transducer available from Olympus NDT of Waltham, Mass. Preferably, one or both of transducers 10 and 12 are spherically focused so as to minimize wave spreading loss, although non-focused transducers may also be used in accordance with the present invention. In the exemplary embodiment, transducer 10 is spherically focused (i.e., has a spherically concave surface) and transducer 12 is flat-faced.

It will be seen that geometric losses (including losses resulting from wave spreading, non-axial or non-parallel alignment of transducers, etc.) are compensated for within the infinite-echo model expressions for the output signal, as described in Section 2 below. These losses may be different depending on whether the wave is travelling from emitter transducer 10 to observer transducer 12 (in which case the geometric loss coefficient is $\kappa_{eo}$ in the infinite-echo model expressions) or from observer transducer 12 to emitter transducer 10 (in which case the geometric loss coefficient is $\kappa_{oe}$ in the infinite-echo model expressions). These geometric loss coefficients ($\kappa_{eo}$ and $\kappa_{oe}$) account for the loss of energy that occurs in the direction orthogonal to the direction of wave propagation, and may also account for the possible loss of energy when the transducers are not axially aligned or not directly facing each other.

It should be understood that a variety of different types of probes or other hardware configurations may be used to support an emitter-observer transducer pair so as to enable the measurement of the viscoelastic properties of a material under measurement using continuous-wave ultrasound in accordance with the present invention.

Figure 2:
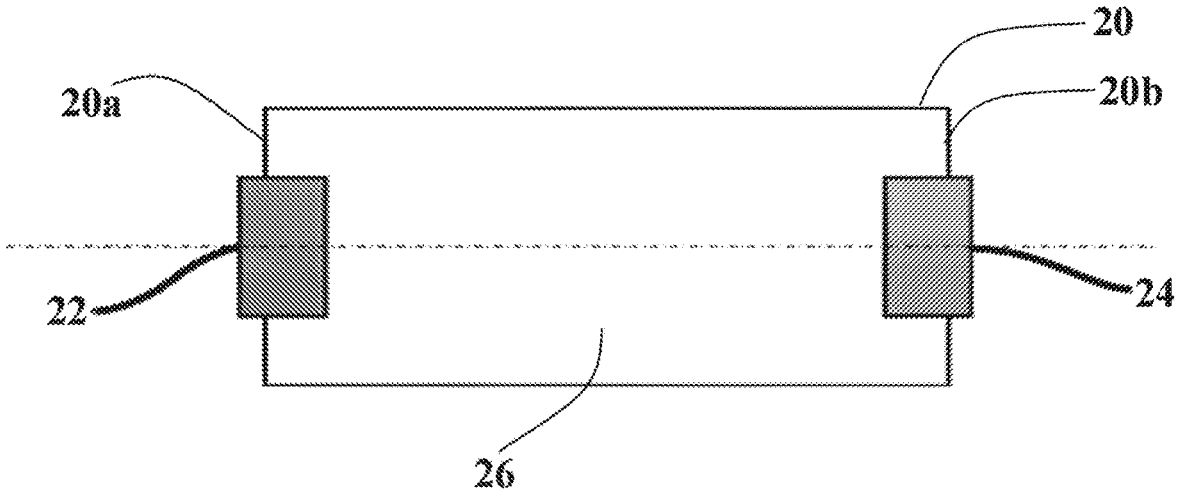
FIG. 2 depicts a brick-shaped reservoir that contains a material under measurement and supports an emitter-observer transducer pair on opposite sidewalls of the reservoir in accordance with a first exemplary embodiment of the invention.

FIG. 2 shows a first exemplary hardware configuration in the form of a brick-shaped reservoir 20 with a first sidewall 20a and a second opposing sidewall 20b. Sidewall 20a supports a first transducer 22 and sidewall 20b supports a second transducer 24 such that the transducers are coaxially mounted a fixed distance apart. Reservoir 20 includes an interior cavity that contains a material under measurement 26. In use, transducers 22 and 24 form an emitter-observer transducer pair in which transducer 22 functions as the emitter and transducer 24 functions as the observer.

Figure 3:
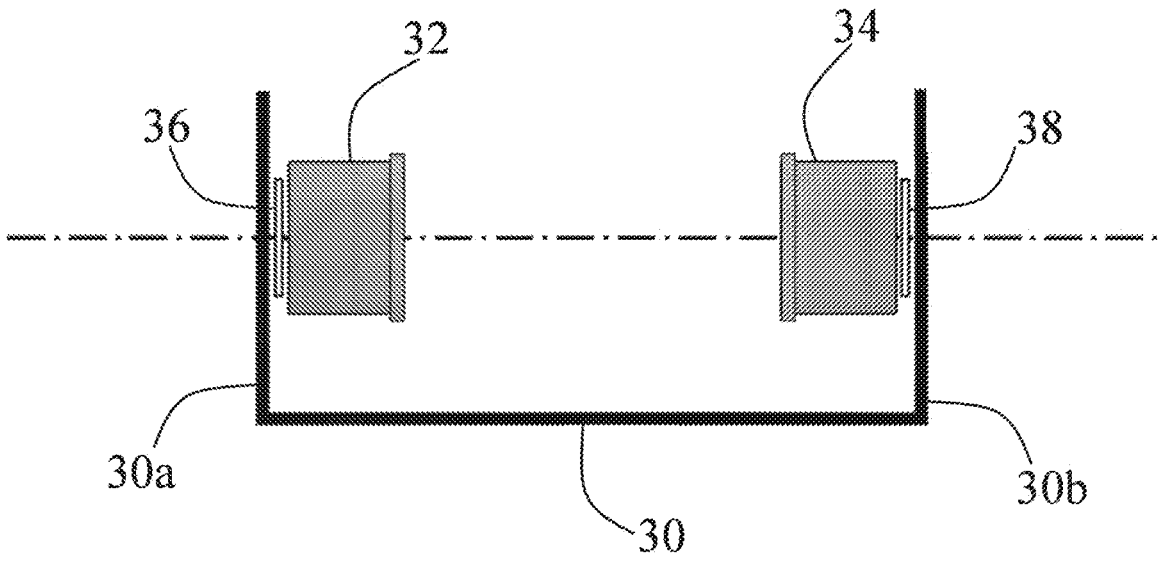
FIG. 3 depicts a C-shaped fixture that supports an emitter-observer transducer pair in accordance with a second exemplary embodiment of the invention.
Figure 4:
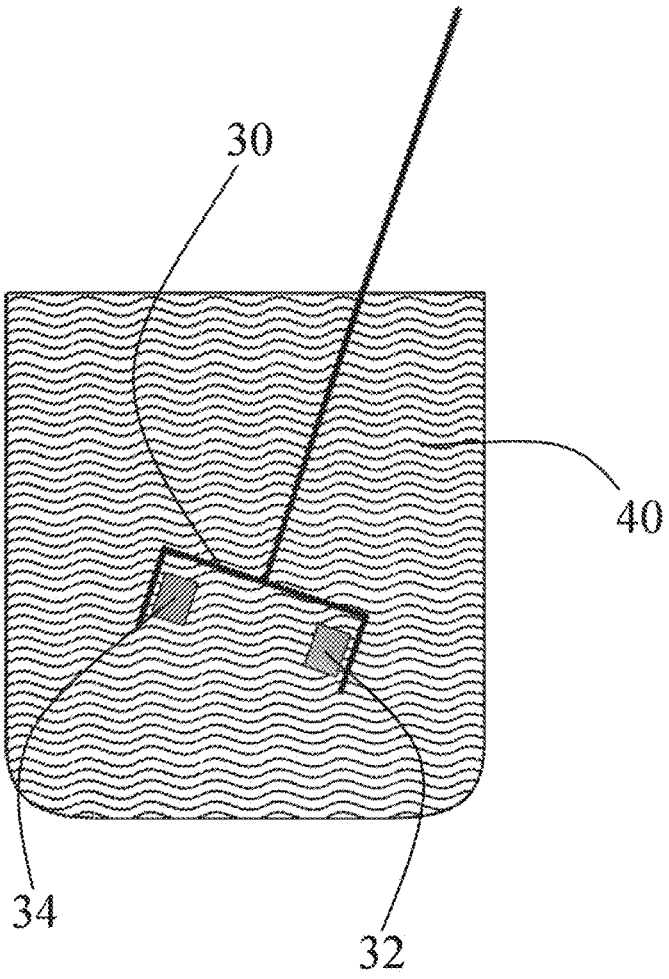
FIG. 4 depicts the C-shaped fixture of FIG. 3 immersed in a material under measurement.

FIG. 3 shows a second exemplary hardware configuration in the form of a C-shaped fixture 30 having two support arms 30a and 30b. Support arm 30a supports a first transducer 32 via a fixed contact 36 and support arm 30b supports a second transducer 34 via a fixed contact 38 such that the transducers are coaxially mounted a fixed distance apart. The C-shaped fixture 30 can be formed into a fork- or Y-shaped probe submergible into a material under measurement 40, as shown in FIG. 4. In use, transducers 32 and 34 form an emitter-observer transducer pair in which transducer 32 functions as the emitter and transducer 34 functions as the observer.

Figure 5:
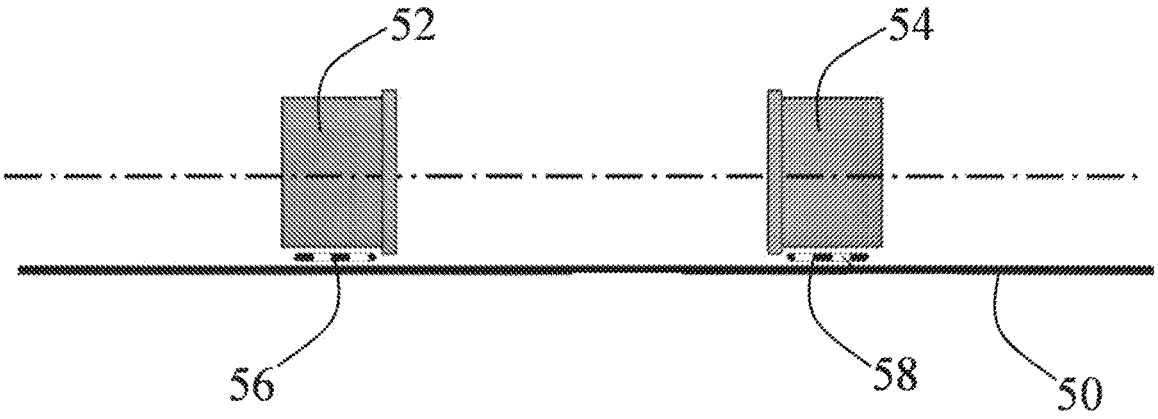
FIG. 5 depicts a rail-type fixture that supports an emitter-observer transducer pair in accordance with a third exemplary embodiment of the invention.
Figure 6:
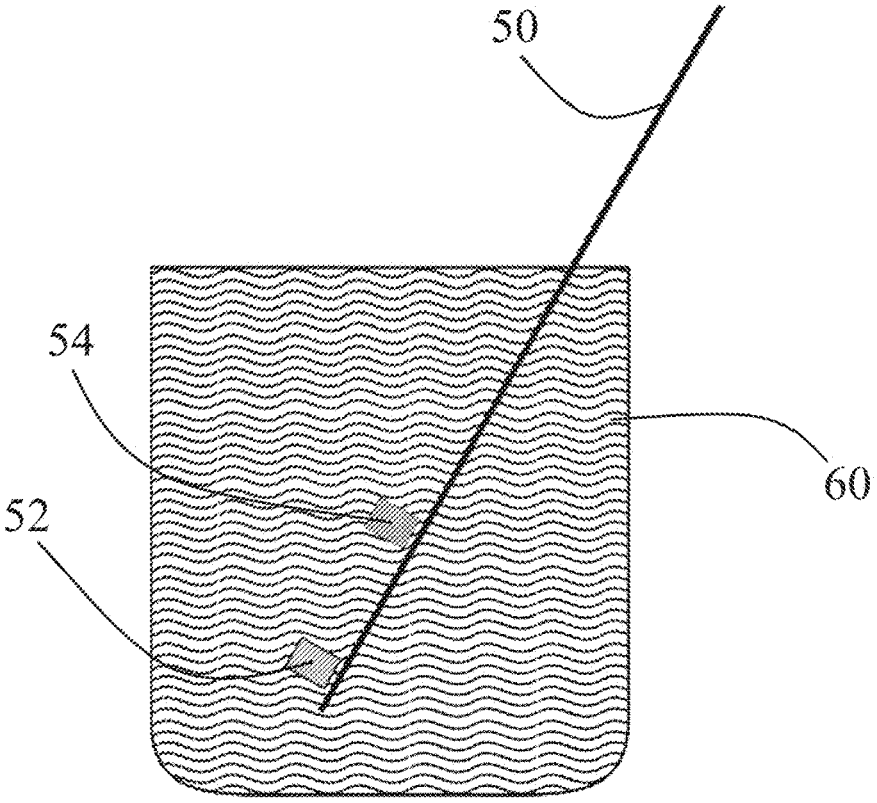
FIG. 6 depicts the rail-type fixture of FIG. 5 immersed in a material under measurement.

FIG. 5 shows a third exemplary hardware configuration in the form of a rail-type fixture 50. Rail-type fixture 50 supports a first transducer 52 via a contact 56 and a second transducer 54 via a contact 58 such that the transducers are coaxially mounted a distance apart. In this example, contacts 56 and 58 may comprise either a fixed contact or a sliding/latching contact. As such, one or both of transducers 52 and 54 may be free to slide along the length of rail-type fixture 50 so as to vary the distance between the transducers and then be latched in a fixed position. The rail-type fixture 50 is configured to be submergible into a material under measurement 60, as shown in FIG. 6. In use, transducers 52 and 54 form an emitter-observer transducer pair in which transducer 52 functions as the emitter and transducer 54 functions as the observer.

Figure 7:
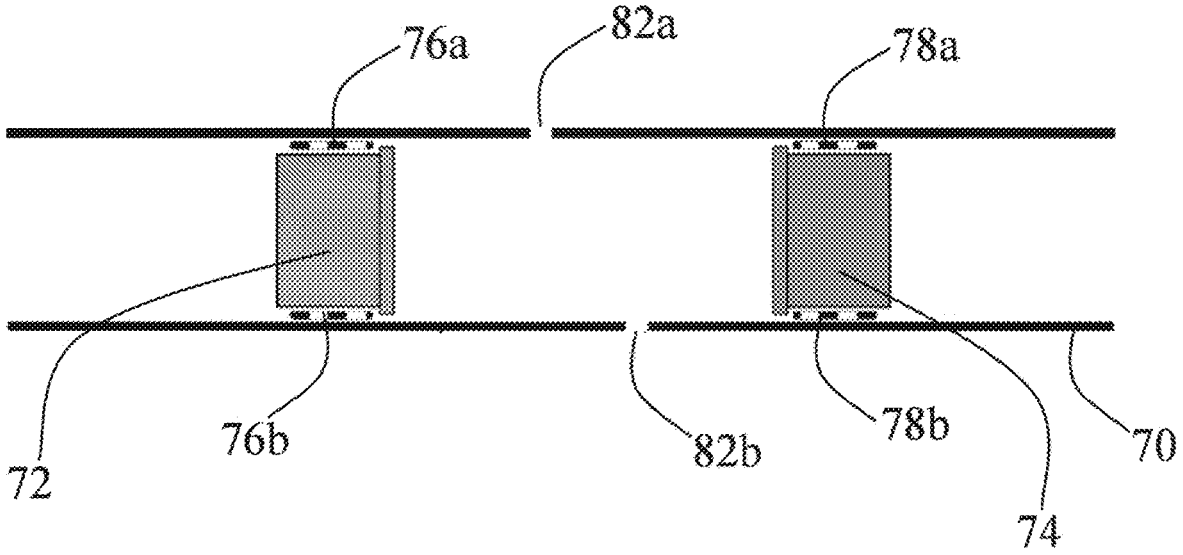
FIG. 7 depicts a conduit-type fixture that supports an emitter-observer transducer pair in accordance with a fourth exemplary embodiment of the invention.
Figure 8:
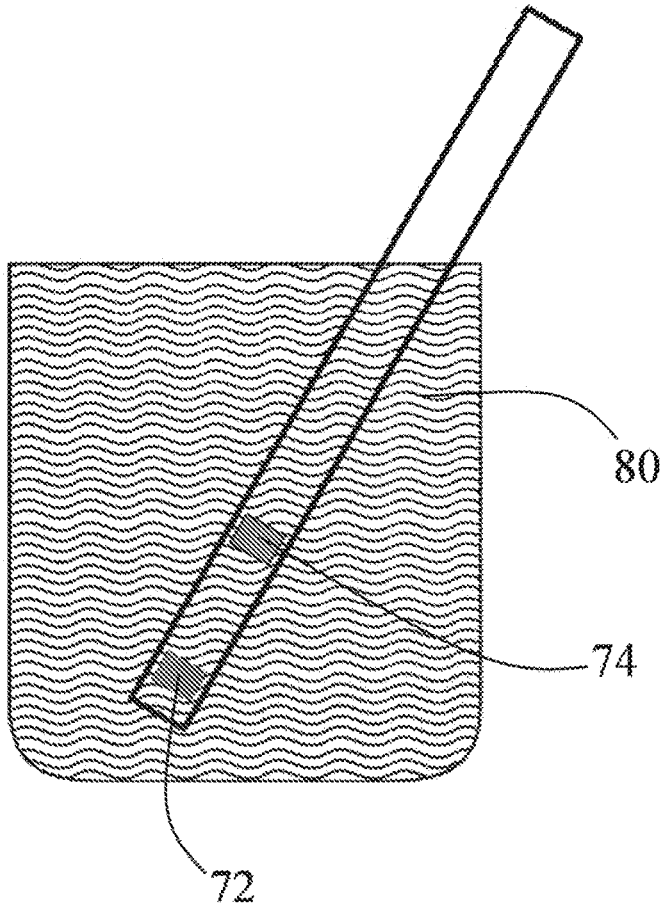
FIG. 8 depicts the conduit-type fixture of FIG. 7 immersed in a material under measurement.

FIG. 7 shows a fourth exemplary hardware configuration in the form of a conduit-type fixture 70. Conduit-type fixture 70 supports a first transducer 72 via contacts 76a/76b and a second transducer 74 via contacts 78a/78b such that the transducers are coaxially mounted a distance apart. In this example, contacts 76a/76b and 78a/78b may comprise either fixed contacts or sliding/latching contacts. As such, one or both transducers 72 and 74 may be free to slide along the length of conduit-type fixture 70 so as to vary the distance between the transducers and then be latched in a fixed position. The conduit-type fixture 70 is configured to be submergible into a material under measurement 80, as shown in FIG. 8. Conduit-type fixture 70 includes one or more openings 82a and 82b in its sidewalls to allow propagation medium 80 to enter or exit the interior of the conduit. In use, transducers 72 and 74 form an emitter-observer transducer pair in which transducer 72 functions as the emitter and transducer 74 functions as the observer.

Figure 9:
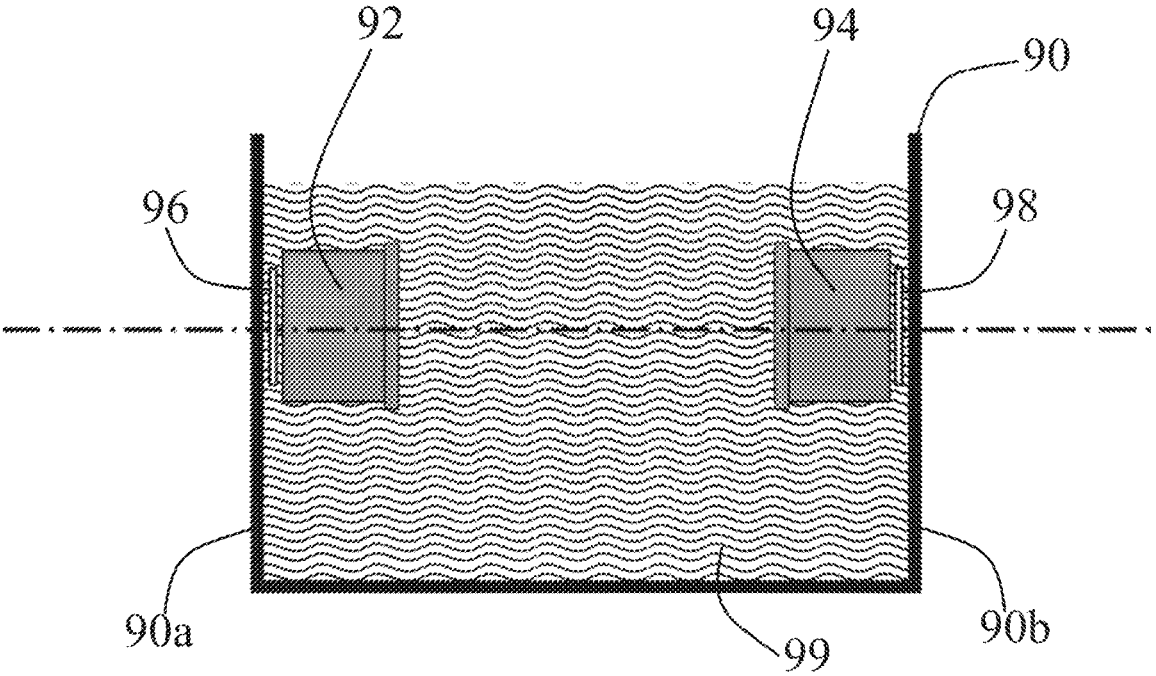
FIG. 9 depicts a vessel that contains a material under measurement and supports an emitter-observer transducer pair on opposite sidewalls of the vessel in accordance with a fifth exemplary embodiment of the invention.

FIG. 9 shows a fifth exemplary hardware configuration in the form of a vessel 90 with a first sidewall 90a and a second opposing sidewall 90b. Sidewall 90a supports a first transducer 92 via a fixed contact 96 and sidewall 90b supports a second transducer 94 via a fixed contact 98 such that the transducers are coaxially mounted a fixed distance apart. Alternatively, the transducers may be held in a fixed position on the same sidewall of vessel 90. Vessel 90 includes an interior cavity that contains a material under measurement 99. In use, transducers 92 and 94 form an emitter-observer transducer pair in which transducer 92 functions as the emitter and transducer 94 functions as the observer.

Figure 10:
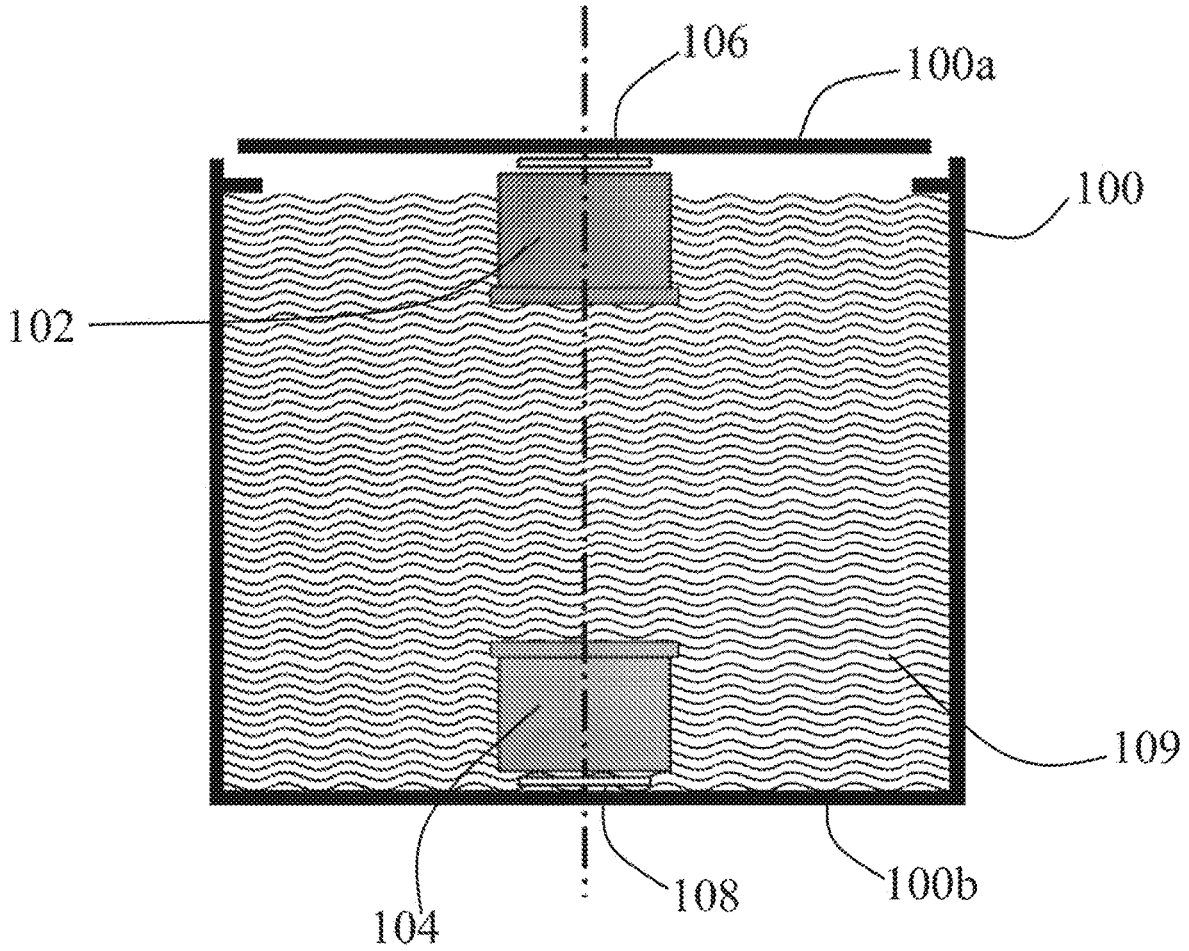
FIG. 10 depicts a vessel that contains a material under measurement and supports an emitter-observer transducer pair on top and bottom walls of the vessel in accordance with a sixth exemplary embodiment of the invention.

FIG. 10 shows a sixth exemplary hardware configuration in the form of a vessel 100 with a removable top 100a and a bottom 100b. Top 100a supports a first transducer 102 via a fixed contact 106 and bottom 100b supports a second transducer 104 via a fixed contact 108 such that the transducers are coaxially mounted a fixed distance apart when top 100a is positioned on vessel 100. Vessel 100 includes an interior cavity that contains a material under measurement 109. In use, transducers 102 and 104 form an emitter-observer transducer pair in which transducer 102 functions as the emitter and transducer 104 functions as the observer.

It should be understood that the present invention is not limited to the exemplary hardware configurations described above. In general, any hardware configuration may be used that is capable of supporting an emitter-observer transducer pair so as to enable the measurement of the viscoelastic properties of a material using continuous-wave ultrasound in accordance with the present invention.

2. Infinite Echo Model

As described above in connection with the system shown in FIG. 1, an excitation signal is applied to transducer 10 and an output signal is recorded at transducer 12. An exemplary excitation signal is shown in FIG. 11, which comprises a continuous-wave sinusoidal waveform having a specified frequency and amplitude. This waveform travels back and forth between the face-plates of transducers 10 and 12 before the waveform is completely attenuated. The original excitation signal and infinite echoes form a summation wave that comprises the output signal. An exemplary output signal is shown in FIG. 11, which comprises a sinusoidal waveform having the same frequency as the excitation signal, but with an amplitude loss and phase lag with respect to the excitation signal. It will be seen that the amplitude and phase of the output signal recorded at transducer 12 are a function of material properties, the distance between transducers 10 and 12, and the frequency of the excitation signal applied to transducer 10.

The original excitation signal (i.e., the input signal) comprises a sinusoidal waveform expressed as follows:

$$u(t)=A\cos(\omega t) \tag{1}$$

where:

A=input amplitude in volts;

ω=input frequency in radians/second; and t=time in seconds.

There are two ways of expressing the corresponding output signal resulting from the original excitation signal and infinite echoes. The first infinite echo model expression is as follows:

$$y(t)=\mathrm{Re}\left[Ae^{i\omega t}\left(\frac{(1+re^{i\theta})\kappa_{eo}e^{\omega L\gamma}}{1-r^2\kappa_{eo}\kappa_{oe}e^{2i(\omega L\gamma+\theta)}}\right)\right] \tag{2}$$

where:

A=input amplitude in volts;

ω=input frequency in radians/second;

t=time in seconds;

r=magnitude of transducer face-plate reflection coefficient;

θ=phase of transducer face-plate reflection coefficient in radians or degrees;

$\kappa_{eo}$=geometric loss coefficient for wave travelling from emitter transducer to observer transducer;

$\kappa_{oe}$=geometric loss coefficient for wave travelling from observer transducer to emitter transducer;

L=distance between transducers in meters; and

γ=reciprocal of a complex form of sound speed in seconds/meter.

The second infinite echo model expression is as follows:

$$y(t)=\mathrm{Re}\left[A\kappa_{eo}e^{i\omega t}\left\{\frac{2\gamma Z_0(\rho+\gamma Z_0)}{(\rho+\gamma Z_0)^2e^{i\omega L\gamma}-(\rho-\gamma Z_0)^2\kappa_{eo}\kappa_{oe}e^{-i\omega L\gamma}}\right\}\right] \tag{3}$$

where:

A=input amplitude in volts;

ω=input frequency in radians/second;

t=time in seconds;

$Z_0$=acoustic impedance of transducer face-plate material in Pascal-seconds/cubic meter;

ρ=density of material in kilograms/cubic meter;

L=distance between transducers in meters;

$\kappa_{eo}$ geometric loss coefficient for wave travelling from emitter transducer to observer transducer;

$\kappa_{oe}$ geometric loss coefficient for wave travelling from observer transducer to emitter transducer; and γ=reciprocal of a complex form of sound speed in seconds/meter.

The geometric loss coefficients ($\kappa_{eo}$ and $\kappa_{oe}$) in equations (2) and (3) account for the loss of energy that occurs in the direction orthogonal to the direction of wave propagation. These coefficients may also account for the possible loss of energy when the transducers are not directly facing each other.

The variable γ in equations (2) and (3) is defined as follows:

$$\gamma=\frac{1}{c}+i\frac{2\eta\omega}{3\rho c^3} \tag{4}$$

where:

γ=reciprocal of a complex form of sound speed in seconds/meter;

c=sound speed of material in meters/second;

$i=\sqrt{-1}$;

η=viscosity of material in kilograms/second-meter;

ρ=density of material in kilograms/cubic meter; and

ω=input frequency in radians/second.

Figure 15:
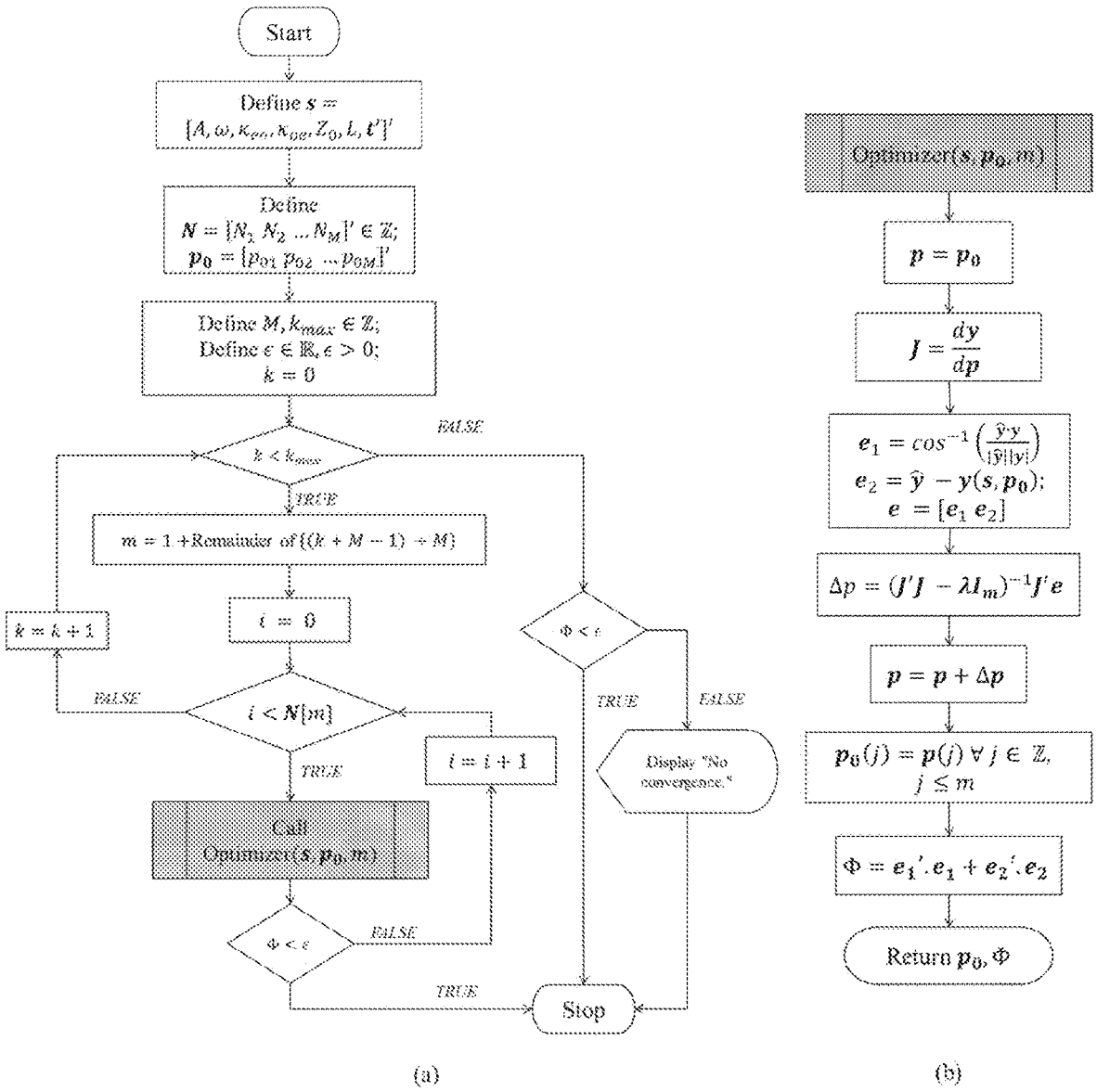
FIG. 15 depicts a parametric optimization algorithm that may be used to determine the viscoelastic properties of a material.

It should be understood that the infinite echo model expressions of equations (2) and (3) are equal but used for different purposes. Equation (2) is convenient for computation and, as described in Section 3 below, is used to measure the sound speed of a material under measurement. Equation (3) is written in terms of the material properties of interest (i.e., sound speed (c), density (ρ), and viscosity (η)) and, as described in Section 4 below, provides a direct expression for parameter optimization by the algorithm shown in FIG. 15.

3. Sound Speed Measurement

The sound speed of a material under measurement significantly affects both the amplitude and phase of the output signal. As such, the parametric optimization algorithm to be utilized in determining the viscoelastic properties of the material, described in Section 4 below, is preferably initialized with a good estimate of sound speed. This Section 3 will describe the methodology for obtaining an initial measurement of the sound speed.

As discussed in Section 2 above, the output signal resulting from the original excitation signal and infinite echoes may be expressed by equation (2). The amplitude of this output signal may be provided as a time-independent expression, as follows:

$$\gamma=\frac{Ae^{-\zeta L}\sqrt{\left(\begin{array}{c}1+r\cos(\theta)-r^2\kappa_{eo}\kappa_{oe}e^{-2\zeta L}\cos\left(\frac{2\omega L}{c}+2\theta\right)-\\ r^3\kappa_{eo}\kappa_{oe}e^{-2\zeta L}\sin\left(\frac{2\omega L}{c}+3\theta\right)\end{array}\right)^2+\left(\begin{array}{c}r\sin(\theta)+r^2\kappa_{eo}\kappa_{oe}e^{-2\zeta L}\sin\left(\frac{2\omega L}{c}+2\theta\right)+\\ r^3\kappa_{eo}\kappa_{oe}e^{-2\zeta L}\sin\left(\frac{2\omega L}{c}+3\theta\right)\end{array}\right)^2}}{1-2r^2\kappa_{eo}\kappa_{oe}e^{-2\zeta L}\cos\left(\frac{2\omega L}{c}+2\theta\right)+r^4\kappa_{eo}^2\kappa_{oe}^2e^{-4\zeta L}} \tag{5}$$

where:

Y=output amplitude in volts;

A=input amplitude in volts;

$\zeta$=attenuation factor;

L=distance between transducers in meters;

r=magnitude of transducer face-plate reflection coefficient;

$\theta$=phase of transducer face-plate reflection coefficient;

$\kappa_{eo}$=geometric loss coefficient for wave travelling from emitter transducer to observer transducer;

$\kappa_{oe}$=geometric loss coefficient for wave travelling from observer transducer to emitter transducer;

$\omega$=input frequency in radians/second; and c=sound speed of material in meters/second.

It can be seen from equation (5) that the output amplitude (Y) is a periodic function of both the input frequency ($\omega$) and the distance between transducers (L). This periodic amplitude is referred to as an amplitude wave ($\Psi$). The amplitude wave may be obtained by varying the input frequency (in which case the amplitude wave is denoted by $\Psi(\omega)$) or by varying the distance between transducers (in which case the amplitude wave is denoted by $\Psi(L)$). Either of the amplitude waves, $\Omega(\omega)$ or $\Omega(L)$, may be used to measure the sound speed of a material under measurement in accordance with the present invention.

Figure 12:
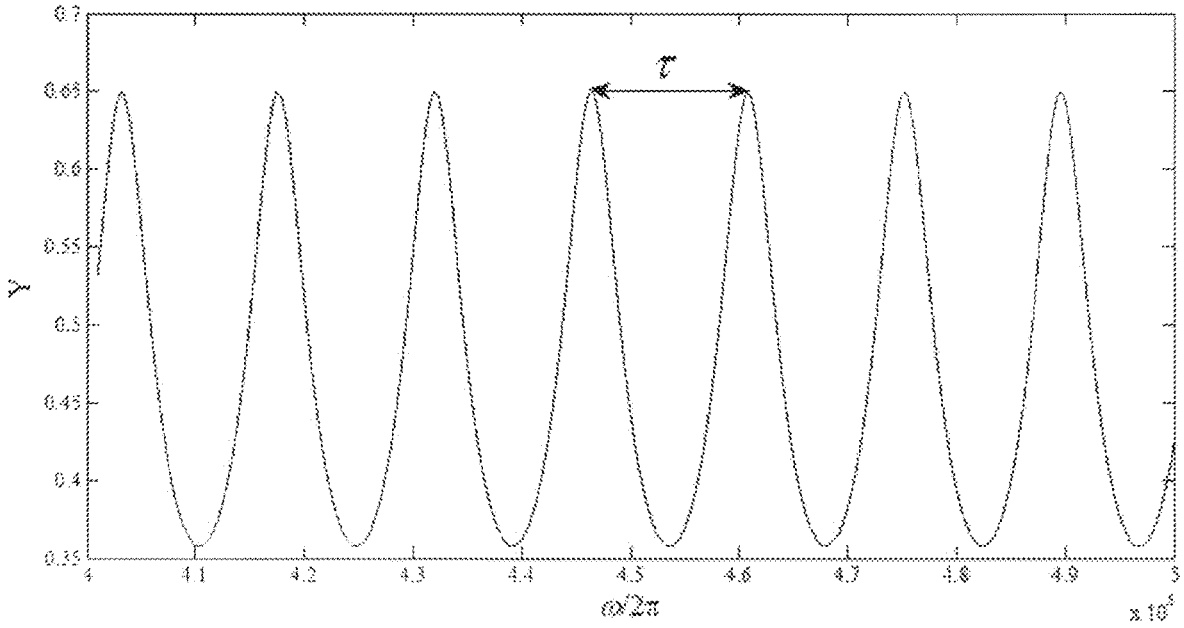
FIG. 12 depicts an exemplary amplitude waveform showing the output amplitude recorded at an observer transducer for a range of input frequencies, wherein measurement of the period between adjacent peaks of the waveform enables calculation of the sound speed.

Typically, it is easier to automate a change of input frequency than to vary the distance between transducers. Thus, in the exemplary embodiment, the input frequency is varied and the output amplitude is measured for each successive input frequency. The output amplitude is then plotted as a function of the ordinary input frequency (f) (i.e., $\omega/2\eta$) to generate an amplitude wave. An exemplary amplitude wave is shown in FIG. 12. As can be seen, the amplitude wave includes a plurality of peaks, which are referred to as resonant peaks. The peak-to-peak distance or period ($\tau$) of the amplitude wave may be expressed as follows:

$$\tau = \frac{c}{2L} \tag{6}$$

where:

$\tau$=period of amplitude wave in hertz;

c=sound speed of material in meters/second; and

L=distance between transducers in meters.

Thus, it can be seen from equation (6) that the period ($\tau$) of the amplitude wave is a measure of sound speed (c) if the distance between transducers (L) is held fixed.

Figure 13:
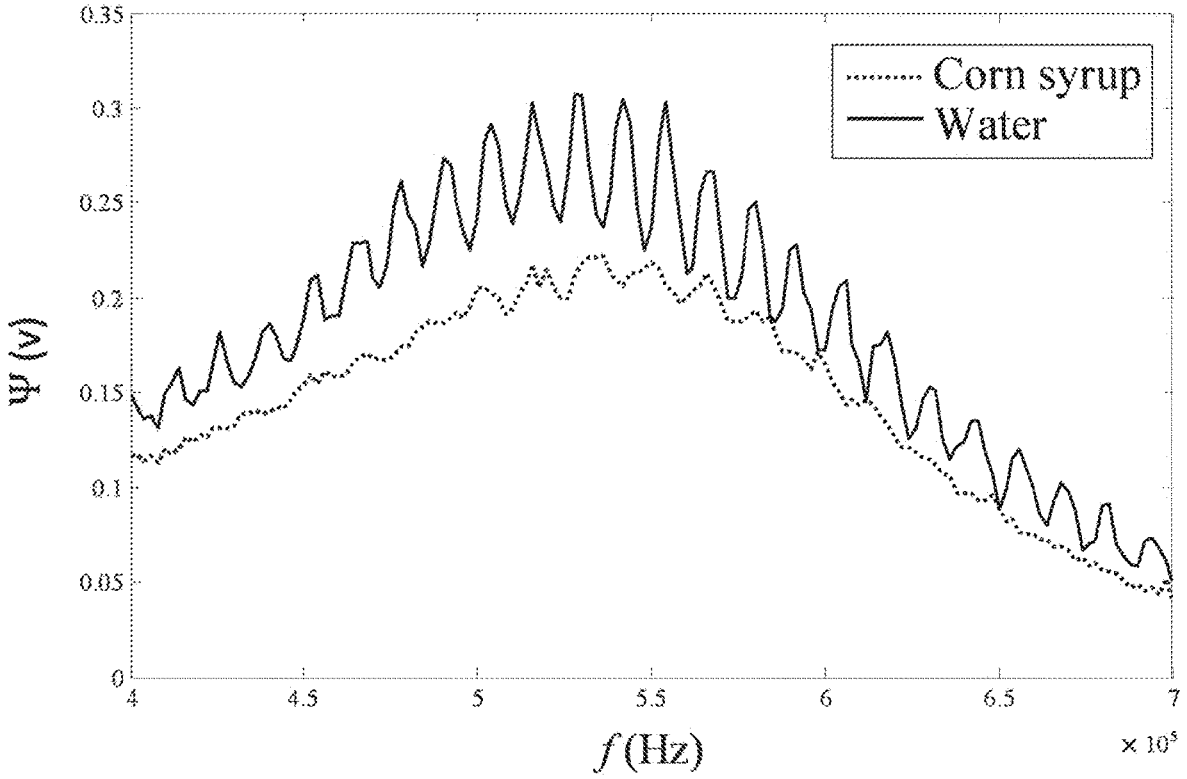
FIG. 13 depicts the amplitude waveforms for corn syrup and water.

The accuracy of the sound speed measurement will depend on how accurately the period ($\tau$) of the amplitude wave is measured. Graphically measuring the period ($\tau$) from the amplitude wave shown in FIG. 12 is possible yet prone to error. Also, in the presence of noise, the resonant peaks of the amplitude wave are not uniform and the period ($\tau$) is even more difficult to measure. For example, FIG. 13 shows the amplitude waves for two different materials, corn syrup and water, in which the resonant peaks are not uniform. It can be appreciated that graphically measuring the period ($\tau$) from the amplitude waves shown in FIG. 13 would yield inaccurate results.

Figure 14:
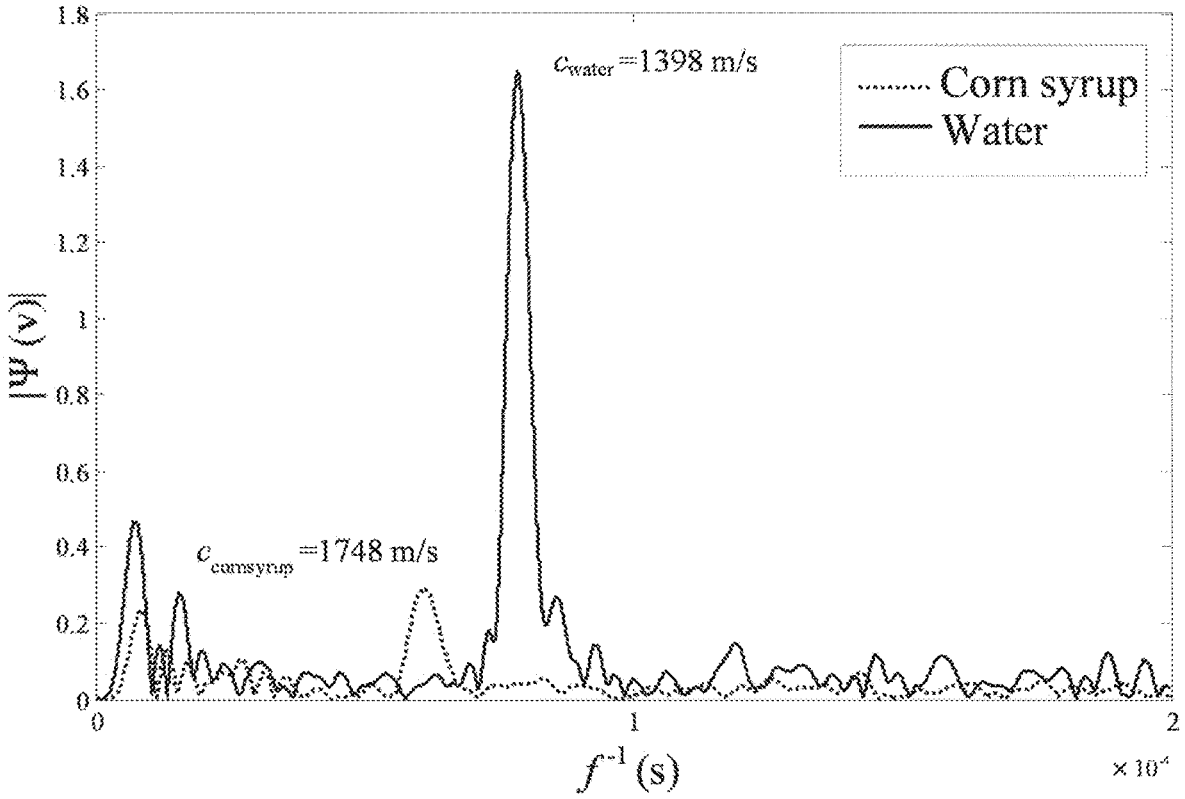
FIG. 14 depicts the Fourier Transforms of the amplitude waveforms shown in FIG. 13, which provide a more accurate measurement of the sound speed.

Instead of measuring the period ($\tau$) in terms of a peak-to-peak distance on the amplitude wave, it is computationally more rigorous to measure the most prominent frequency component in the Frequency Transform (FT) of the amplitude wave. In this case, $$\frac{1}{\tau}$$

will be the frequency corresponding to the highest peak in the amplitude spectrum. For example, FIG. 14 shows the FT of each of the amplitude waves for corn syrup and water shown in FIG. 13. The height of the prominent peaks varies due to the distinct viscous properties of the two materials. However, only the positions of the highest peaks on the horizontal axis are relevant to determining the period ($\tau$) and thus to measuring the sound speed of these materials. This method provides greater accuracy than directly measuring the period ($\tau$) of the amplitude wave.

The accuracy and precision of the sound speed measurement depends upon the resolution of the frequency spectrum, i.e., the range of input frequencies and the step size by which the frequencies are varied. Typically, the input frequencies should be in the transducer bandwidth, which is selected according to the estimated bandwidth of the material under measurement. Within that range, using a low number of frequencies for the frequency sweep will compromise the accuracy of the sound speed due to distortion of the individual resonant peaks. On the other hand, an excessive number of frequencies will not provide any significant advantage and only increases the data size and associated processing time. So, while it is important to select the optimal range of input frequencies, it is also important to place a lower limit on the number of frequencies within that range in order to maintain reliability of the sound speed estimate. Also, during collection of the data, the conditions within the material preferably remain as close to stable as possible, e.g., the temperature is preferably regulated in order to improve sound speed accuracy.

In the exemplary embodiment, the RS Model DS340 15 MHz Synthesized Function Generator, which is used to generate each excitation signal, is connected through a serial port to a computing device, such as a personal computer, tablet or smartphone. Also, the GDS-2062 Series 60 MHz Digital Storage Oscilloscope, which is used to record each output signal, is connected through a USB port to this same computing device. This computing device is programmed to execute a control script that automates the frequency sweep so as to successively generate excitation signals at a plurality of input frequencies and apply them to transducer 10. The control script also automates the real-time collection of data so as to record the output signals associated with the input frequencies. The computing device is thus part of signal processing assembly 16 shown in FIG. 1. Of course, other types of computing devices may also be used in accordance with the present invention.

4. Determination of Viscosity

As described in Section 2 above, the output signal resulting from the original excitation signal and infinite echoes is expressed in equation (3), which is written in terms of the material properties of interest (i.e., sound speed (c), density ($\rho$), and viscosity ($\eta$)). In this Section 4, a parametric optimization algorithm is used to determine the optimum values for sound speed (c), density ($\rho$), and viscosity ($\eta$) that cause the output signal expressed in equation (3) to fit the measured output signal. Depending on the material under measurement, parameter optimization based on measurement of a single frequency can yield satisfactory results but use of values from multiple frequencies often leads to improved accuracy. The parametric optimization algorithm is preferably initialized with a good estimate of sound speed to ensure convergence to the true parameter values.

A flow diagram of a general parametric optimization algorithm that is designed to improve convergence performance of classical optimization methods of nonlinear regression is shown in FIG. 15(a). As can be seen, the algorithm initially defines a set of variables (s), including the input amplitude in volts (A), the input frequency in radians/second ($\omega$), the geometric loss coefficient for a wave travelling from emitter to observer ($\kappa_{eo}$), the geometric loss coefficient for a wave travelling from observer to emitter ($\kappa_{oe}$), the acoustic impedance of the transducer face-plate material in Pascal-seconds/cubic meter ($Z_0$), the distance between transducers in meters (L), and the time in seconds (t).

Next, the algorithm defines a weight array (N) that assigns a weight to each of the unknown properties in the parameter array. The algorithm also defines the initial values of the unknown properties in the parameter array ($p_0$). Then, the algorithm defines the total number of unknown properties (M). For example, if there are 4 unknown properties to be simultaneously optimized, the algorithm is set to a maximum dimensionality of M=4. The algorithm also defines the maximum number of iterations that the parameters are to be revised ($k_{max}$) and an acceptable level of error ($\in$).

The algorithm then performs a number of iterations to optimize the values of the unknown properties in the parameter array. During each iteration, the algorithm changes the number of unknown properties to be treated as a variable (m) so as to sequentially perform 4-dimensional, 3-dimensional, 2-dimensional, or 1-dimensional optimizations. This process is repeated until either the error ($\Phi$) is minimized to the acceptable level ($\in$) or the number of iterations has reached the maximum ($k_{max}$).

During each iteration, it can be seen that the algorithm calls an optimizer function, as shown in FIG. 15(b). In doing so, the algorithm provides to the optimizer function the defined set of variables (s), the current values of the unknown properties in the parameter array ($p_0$), and the number of unknown properties to be treated as a variable in the current iteration (m). The optimizer function then adjusts the unknown properties in an attempt to fit the analytical model's output signal ($\hat{y}$) to the measured output signal (y). The optimizer function then returns the refined values of the unknown properties in the parameter array ($p_0$) and the objective function for the optimization algorithm ($\Phi$). It should be understood that the optimizer function is customized according to the application of interest.

In the exemplary embodiment, the parametric optimization algorithm is applied to a case where viscosity ($\eta$) is the measurand of prime interest, sound speed (c) has been measured using the methodology described in Section 3 above, and density ($\rho$) is known from prior measurement and compensated for temperature variations. The initial values of the unknown properties in the parameter array ($p_0$) are as follows: (1) $p_{01}$=a random positive number; (2) $p_{02}=2\tau L$; and (3) $p_{03}=\rho_{measured}$. It should be noted that density, despite being a known value, is stored in the initial parameter array merely to simplify the modification of the algorithm for simultaneous optimization of density, when required.

The value of density is kept constant during the parameter search and, thus, the algorithm is set to a maximum dimensionality of M=2. During each iteration, the algorithm changes the number of unknown properties to be treated as a variable (m) so as to sequentially perform a 2-dimensional search (in which case the parameter array is [$\eta$ c]) and a 1-dimensional search (in which case the parameter array is [$\eta$]). For simplicity, the optimization in each partial parameter space ($m \leq M$) could be carried out just once, in which case the weight array N=[1 1]. Alternatively, the weight array N may be changed so as to focus on viscosity ($\eta$) in the error correction. For example, if the weight array N=[3 1], viscosity ($\eta$) has three times the significance of sound speed (c) in correcting the error in the output signal.

In the exemplary embodiment, the optimizer function corrects the values for viscosity ($\eta$) and sound speed (c) in an attempt to fit the output signal ($\hat{y}$) expressed in equation (3) to the measured output signal (y) generated by the continuous-wave excitation to the material under measurement. The objective function ($\Phi$) is comprised of two separate parts. One part accounts for the error in phase, which is improved by the correction in sound speed (c) alone. The other part accounts for the error in amplitude, which is improved by the combined effect of the corrections in both sound speed (c) and viscosity ($\eta$). Even though the sound speed (c) does not vary much during the optimization process, its frequency characteristic serves as a useful criterion for the validity of viscosity measurements. For example, any sudden jumps in sound speed over frequency automatically disqualify a viscosity measurement.

In the end, the parameter optimization provides the optimum values for viscosity (the measurand of prime interest) and sound speed for the material under measurement. It should be noted that the optimum value for sound speed may deviate slightly from the initial value of sound speed due to the corrections offered by the parametric optimization algorithm. In addition, it should be understood that various modifications could be made to this methodology without departing from the scope of the present invention. For example, instead of providing an initial measurement of sound speed as described above, one could alternatively provide an initial measurement of elasticity. Other modifications will be apparent to one skilled in the art.

Various experiments were conducted to validate the ultrasound-based viscosity measurements against the readings obtained with the LVDTV-II viscometer available from Brookfield Engineering Laboratories, Inc. of Middleboro, Mass.

Figure 16:
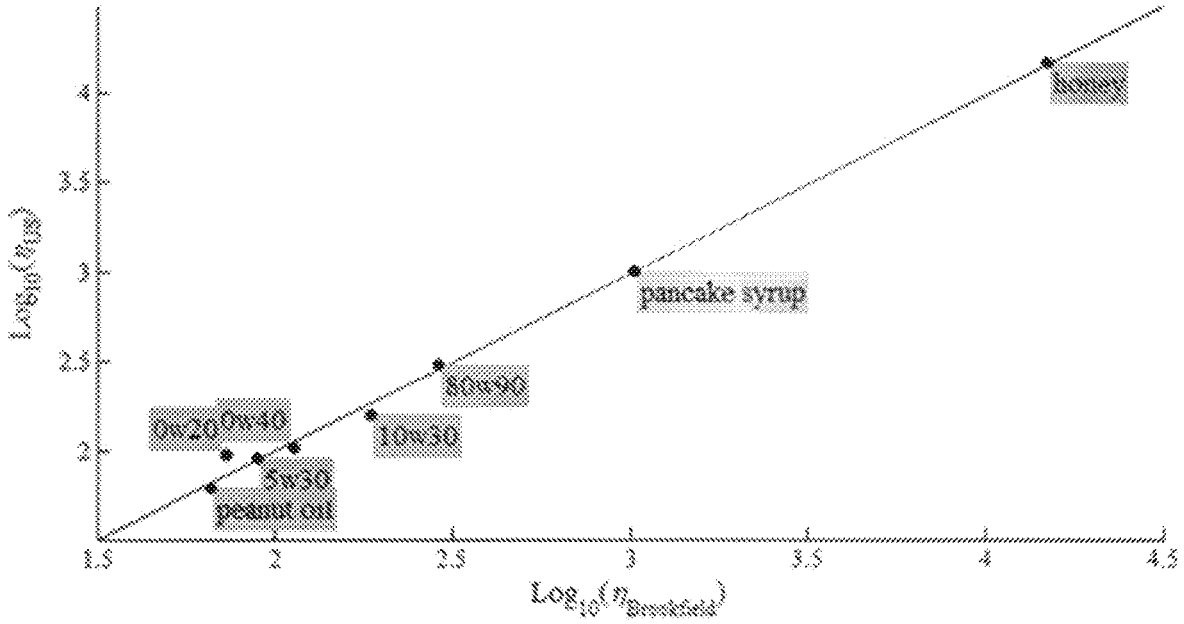
FIG. 16 depicts the in-situ viscosity measurement data collected at room temperature plotted against the standard measurements obtained using a Brookfield viscometer for a variety of materials (peanut oil, pancake syrup, honey, and SAE viscosity grades 0w20, 0w40, 5w30, 10w30, and 80w90 of automobile lubricants).

In a first experiment, the ultrasound-based methodology described herein was used to collect viscosity measurements at room temperature for a wide range of distinctly viscous fluids—peanut oil, pancake syrup, honey and various SAE viscosity grades of automobile lubricants (i.e., 0w20, 0w40, 5w30, 10w30, and 80w90). FIG. 16 shows the in-situ viscosity measurement data plotted against the standard measurements obtained using Brookfield's viscometer after calibration to account for instrumentation gain and shear rate differences between the two methods. It should be noted that the tested materials are widely scattered in terms of their viscosities at room temperature and, thus, a logarithmic scale is used in FIG. 16 to consolidate the values over a narrower range. As can be seen, a positive correlation was observed between the two sets of results.

Figure 17:
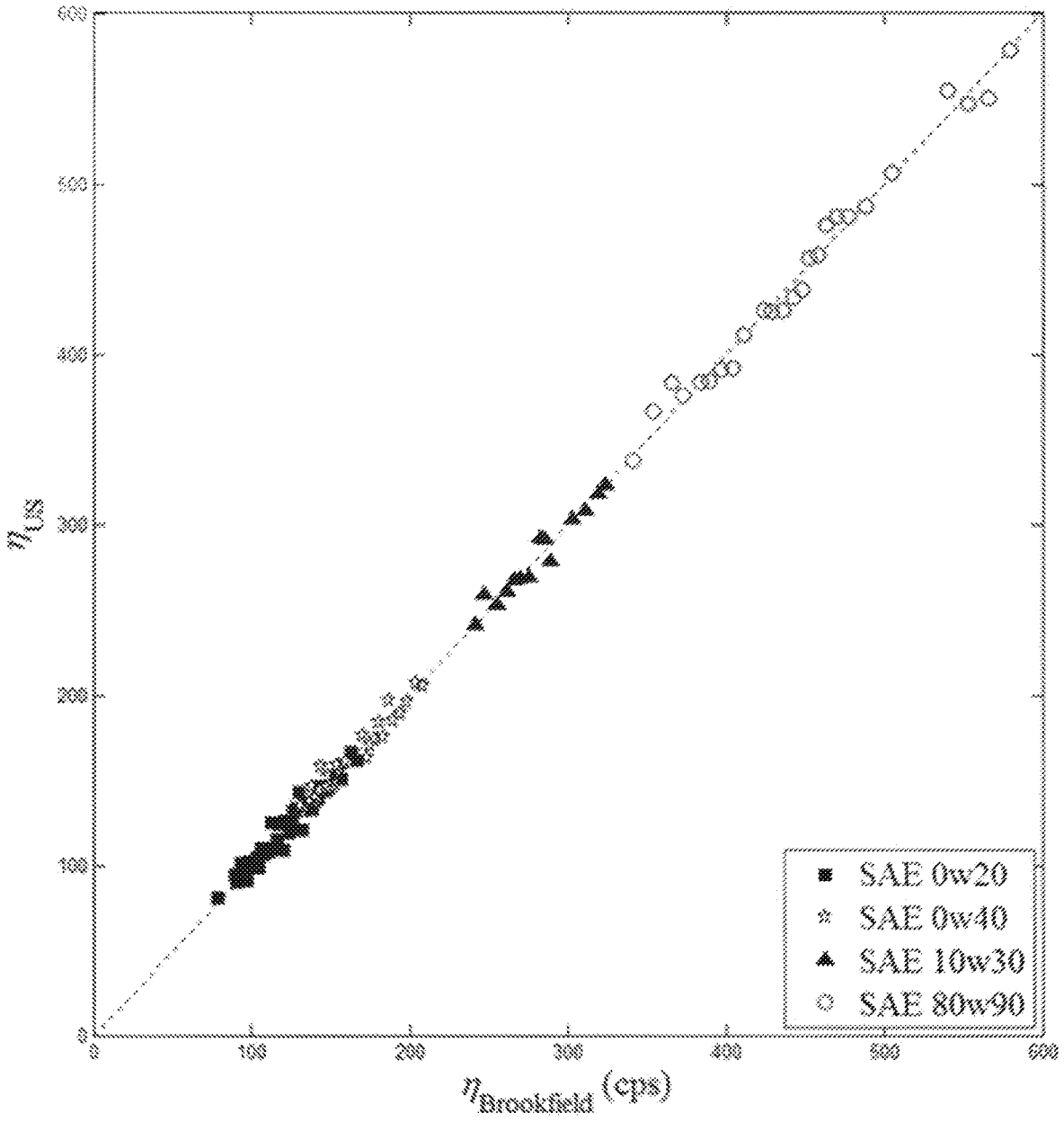
FIG. 17 depicts the in-situ viscosity measurement data collected over a range of temperatures plotted against the standard measurements obtained using a Brookfield viscometer for a variety of materials (SAE viscosity grades 0w20, 0w40, 10w30, and 80w90 of automobile lubricants).

In a second experiment, the ultrasound-based methodology described herein was used to collect viscosity measurements over a range of temperatures on various SAE viscosity grades of automobile lubricants (i.e., 0w20, 0w40, 10w30, and 80w90). FIG. 17 shows the in-situ viscosity measurement data plotted against the standard measurements obtained using Brookfield's viscometer after calibration. Again, a strong positive correlation was observed between the two sets of results.

The present invention offers many advantages that are not possible with conventional techniques for measuring the viscoelastic properties of a material under measurement, including: (1) fast measurement allowing real-time monitoring of the rheological behavior of Newtonian and non-Newtonian liquids (e.g., a response time of less than 400 ms); (2) only a small sample quantity of the material under measurement is required; (3) the methodology provides a significantly improved SNR resulting from the use of continuous-wave excitation (e.g., an SNR greater than 1,000); (4) unlike conventional viscometers, there are no moving parts such that the system is durable and easy to maintain; (5) no bypass is required for in-line use and thus the probe can be immersed or embedded in-situ; (6) the high frequency of the excitation signals minimizes the effect of flow conditions; (7) the probes may be small-sized and inexpensive; (8) automatic viscosity measurements over a range of ultrasound frequencies serve as a comprehensive ultrasound signature of a material; and (9) lightweight and on-board computing ability allows the design to be implemented on portable or handheld devices such as smartphones or tablets. One skilled in the art will understand that the present invention has wide-ranging applications in machinery, chemical, pharmaceutical, food and material processing, medicine, and numerous other areas.

5. General

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as") provided with respect to certain embodiments is intended merely to better describe the invention and does not pose a limitation on the scope of the invention. No language in the description should be construed as indicating any non-claimed element essential to the practice of the invention.

The use of relative relational terms, such as first and second or top and bottom, are used solely to distinguish one unit or action from another unit or action without necessarily requiring or implying any actual such relationship or order between such units or actions.

The use of the terms "comprises," "comprising," or any other variation thereof, are intended to cover a non-exclusive inclusion, such that a process, method, device, or system that comprises a list of elements does not include only those elements, but may include other elements not expressly listed or inherent to such process, method, device, or system.

While the present invention has been described and illustrated hereinabove with reference to several exemplary embodiments, it should be understood that various modifications could be made to these embodiments without departing from the scope of the invention. Therefore, the present invention is not to be limited to the specific configurations or methodologies of the exemplary embodiments, except insofar as such limitations are included in the following claims.

What is claimed and desired to be secured by Letters Patent is as follows:

1. A system for measuring at least one [viscoelastic] *material* property of a material under measurement, comprising:

an emitter-observer transducer pair [configured to be positioned within the material under measurement, wherein the transducer pair comprises] *comprising* an emitter transducer spaced from an observer transducer, *wherein the emitter transducer and the observer transducer are positioned on opposite sides of the material under measurement*;

a signal processing assembly connected to the emitter transducer and the observer transducer, wherein the signal processing assembly is operable to:

apply a plurality of excitation signals to the emitter transducer, wherein each of the excitation signals comprises a continuous-wave sinusoidal waveform;

record a plurality of output signals at the observer transducer, wherein each of the output signals corresponds to one of the excitation signals, and wherein each of the output signals comprises a sum of the corresponding one of the excitation signals and a plurality of attenuated echoes traveling between the emitter transducer and the observer transducer; *and* analyze the output signals to [measure the sound speed of the material; and] *determine a material property of the material under measurement, wherein the material property comprises one of a sound speed, a viscosity, an elasticity, and a density of the material under measurement*

[utilize the measured sound speed to determine the viscoelastic property of the material under measurement].

2. The system of claim 1, further comprising a reservoir having a first sidewall and a second sidewall, wherein the first sidewall supports the emitter transducer and the second sidewall supports the observer transducer, and wherein the reservoir has an interior cavity that contains the material under measurement.

3. The system of claim 1, further comprising a C-shaped fixture having a first support arm and a second support arm, wherein the first support arm supports the emitter transducer and the second support arm supports the observer transducer, and wherein the C-shaped fixture is submergible into the material under measurement.

4. The system of claim 1, further comprising a vessel having a first sidewall and a second sidewall, wherein the first sidewall supports the emitter transducer and the second sidewall supports the observer transducer, and wherein the vessel has an interior cavity that contains the material under measurement.

5. The system of claim 1, further comprising a vessel having a removeable top and a bottom, wherein the top supports the emitter transducer and the bottom supports the observer transducer, and wherein the vessel has an interior cavity that contains the material under measurement.

6. The system of claim 1, wherein at least one of the emitter transducer and the observer transducer is spherically focused.

7. The system of claim 1, wherein [the] *a* measured sound speed is used as an input to a parametric optimization algorithm to determine [the viscoelastic property] *one of the viscosity, the elasticity, and the density* of the material under measurement.

[8. The system of claim 1, wherein the viscoelastic property comprises viscosity, elasticity, or density.]

9. The system of claim 1, further comprising a rail that supports the emitter transducer and the observer transducer, wherein the rail is submergible into the material under measurement.

10. The system of claim 9, wherein one or both of the emitter transducer and the observer transducer are slideable on the rail so as to vary a distance between the emitter transducer and the observer transducer.

11. The system of claim 1, further comprising a conduit that supports the emitter transducer and the observer transducer, wherein the conduit is submergible into the material under measurement.

12. The system of claim 11, wherein one or both of the emitter transducer and the observer transducer are slideable within the conduit so as to vary a distance between the emitter transducer and the observer transducer.

13. The system of claim 1, wherein each of the excitation signals has an input frequency and each of the output signals has an output amplitude.

14. The system of claim 13, *wherein the material property comprises the sound speed of the material under measurement, and* wherein the signal processing assembly analyzes the output signals to [measure] *determine* the sound speed of the material under measurement by:

generating an amplitude wave in which the output amplitude of each of the output signals is plotted as a function of the input frequency of the corresponding one of the excitation signals;

determining the period of the amplitude wave; and calculating the sound speed associated with the period of the amplitude wave for a fixed distance between the emitter transducer and the observer transducer.

15. The system of claim 14, wherein the signal processing assembly determines the period of the amplitude wave by graphically measuring the period of the amplitude wave.

16. The system of claim 14, wherein the signal processing assembly determines the period of the amplitude wave by:

generating a Frequency Transform (FT) of the amplitude wave;

identifying a frequency corresponding to a highest peak in the Frequency Transform (FT) of the amplitude wave; and calculating the period of the amplitude wave based on the identified frequency.

17. A method for measuring at least one [viscoelastic] *material* property of a material under measurement, comprising:

positioning an emitter transducer [spaced from] *and* an observer transducer [in] *on opposite side of* the material under measurement;

applying a plurality of excitation signals to the emitter transducer, wherein each of the excitation signals comprises a continuous-wave sinusoidal waveform;

recording a plurality of output signals at the observer transducer, wherein each of the output signals corresponds to one of the excitation signals, and wherein each of the output signals comprises a sum of the corresponding one of the excitation signals and a plurality of attenuated echoes traveling between the emitter transducer and the observer transducer; *and* analyzing the output signals to [measure the sound speed of the material under measurement; and] *determine a material property of the material under measurement, wherein the material property comprises one of a sound speed, a viscosity, an elasticity, and a density of the material under measurement*

[utilizing the measured sound speed to determine the viscoelastic property of the material under measurement].

18. The method of claim 17, wherein each of the excitation signals has an input frequency and each of the output signals has an output amplitude.

19. The method of claim 17, wherein [the] *a* measured sound speed is used as an input to a parametric optimization algorithm to determine [the viscoelastic property] *one of the viscosity, the elasticity, and the density* of the material under measurement.

[20. The method of claim 17, wherein the viscoelastic property comprises viscosity, elasticity, or density.]

21. The method of claim 17, *wherein the material property comprises the sound speed of the material under measurement, and* wherein the step of analyzing the output signals to [measure] *determine* the sound speed of the material under measurement comprises:

generating an amplitude wave in which the output amplitude of each of the output signals is plotted as a function of the input frequency of the corresponding one of the excitation signals;

determining the period of the amplitude wave; and calculating the sound speed associated with the period of the amplitude wave for a fixed distance between the emitter transducer and the observer transducer.

22. The method of claim 21, wherein the step of determining the period of the amplitude wave comprises graphically measuring the period of the amplitude wave.

23. The method of claim 21, wherein the step of determining the period of the amplitude wave comprises:

generating a Frequency Transform (FT) of the amplitude wave;

identifying a frequency corresponding to a highest peak in the Frequency Transform (FT) of the amplitude wave; and calculating the period of the amplitude wave based on the identified frequency.

24. A system for measuring [at least one viscoelastic property] *a sound speed* of a material under measurement, comprising:

an emitter-observer transducer pair [configured to be positioned within the material under measurement, wherein the transducer pair comprises] *comprising* an emitter transducer spaced from an observer transducer, *wherein the emitter transducer and the observer transducer are positioned on opposite sides of the material under measurement*;

a signal processing assembly connected to the emitter transducer and the observer transducer, wherein the signal processing assembly is operable to:

apply a plurality of excitation signals to the emitter transducer, wherein each of the excitation signals comprises a continuous-wave sinusoidal waveform having an input frequency;

record a plurality of output signals at the observer transducer, wherein each of the output signals corresponds to one of the excitation signals and has an output amplitude; *and* analyze the output signals to measure the sound speed of the material under measurement by (a) generating an amplitude wave in which the output amplitude of each of the output signals is plotted as a function of the input frequency of the corresponding one of the excitation signals, (b) determining the period of the amplitude wave, and (c) calculating the sound speed associated with the period of the amplitude wave for a fixed distance between the emitter transducer and the observer transducer[; and utilize the measured sound speed to determine the viscoelastic property of the material under measurement].

25. A system for measuring at least one viscoelastic property of a material under measurement, comprising:

an emitter-observer transducer pair [configured to be positioned within the material under measurement, wherein the transducer pair comprises] *comprising* an emitter transducer spaced from an observer transducer, *wherein the emitter transducer and the observer transducer are separated by the material under measurement*;

a signal processing assembly connected to the emitter transducer and the observer transducer, wherein the signal processing assembly is operable to:

apply a plurality of excitation signals to the emitter transducer, wherein each of the excitation signals comprises a continuous-wave sinusoidal waveform;

record a plurality of output signals at the observer transducer, wherein each of the output signals corresponds to one of the excitation signals;

analyze the output signals to measure the sound speed of the material; and utilize the measured sound speed as an input to a parametric optimization algorithm to determine the viscoelastic property of the material under measurement.

26. A method for measuring [at least one viscoelastic property] *a sound speed* of a material under measurement, comprising:

positioning an emitter transducer [spaced from] *and* an observer transducer [in the material under measurement] *so that the emitter transducer and the observer transducer are positioned on opposite sides of the material under measurement*;

applying a plurality of excitation signals to the emitter transducer, wherein each of the excitation signals comprises a continuous-wave sinusoidal waveform;

recording a plurality of output signals at the observer transducer, wherein each of the output signals corresponds to one of the excitation signals; *and* analyzing the output signals to measure the sound speed of the material under measurement by (a) generating an amplitude wave in which the output amplitude of each of the output signals is plotted as a function of the input frequency of the corresponding one of the excitation signals, (b) determining the period of the amplitude wave, and (c) calculating the sound speed associated with the period of the amplitude wave for a fixed distance between the emitter transducer and the observer transducer[; and utilizing the measured sound speed to determine the viscoelastic property of the material under measurement].

27. A method for measuring at least one viscoelastic property of a material under measurement, comprising:

positioning an emitter transducer [spaced from] *and* an observer transducer [in] *on opposite sides of* the material under measurement;

applying a plurality of excitation signals to the emitter transducer, wherein each of the excitation signals comprises a continuous-wave sinusoidal waveform;

recording a plurality of output signals at the observer transducer, wherein each of the output signals corresponds to one of the excitation signals;

analyzing the output signals to measure the sound speed of the material under measurement; and utilizing the measured sound speed as an input to a parametric optimization algorithm to determine the viscoelastic property of the material under measurement.

* * * * *